US011341490B2

(12) United States Patent
Jawaharlal et al.

(10) Patent No.: US 11,341,490 B2
(45) Date of Patent: May 24, 2022

(54) CARBON FOOTPRINT BLOCKCHAIN NETWORK

(71) Applicant: International Business Machines Corporation, Armonk, NY (US)

(72) Inventors: Samuel M. Jawaharlal, Chennai (IN); Sarbajit K. Rakshit, Kolkata (IN); Sathya Santhar, Chennai (IN); Balamurugaramanathan Sivaramalingam, Paramakudi (IN)

(73) Assignee: International Business Machines Corporation, Armonk, NY (US)

( * ) Notice: Subject to any disclaimer, the term of this patent is extended or adjusted under 35 U.S.C. 154(b) by 357 days.

(21) Appl. No.: 15/730,270

(22) Filed: Oct. 11, 2017

(65) Prior Publication Data

US 2019/0108516 A1    Apr. 11, 2019

(51) Int. Cl.
*G06Q 20/38*       (2012.01)
*G06Q 20/36*       (2012.01)
(Continued)

(52) U.S. Cl.
CPC ..... *G06Q 20/3829* (2013.01); *G06Q 10/0639* (2013.01); *G06Q 20/3674* (2013.01);
(Continued)

(58) Field of Classification Search
CPC ........... G06Q 20/3829; G06Q 10/0639; G06Q 20/3674; G06Q 20/401; G06Q 2220/00;
(Continued)

(56) References Cited

U.S. PATENT DOCUMENTS

2007/0233616 A1* 10/2007 Richards ................ G06Q 10/06
                                                    705/400
2009/0106149 A1*  4/2009 Bennett ................ G06Q 20/108
                                                    705/42
(Continued)

FOREIGN PATENT DOCUMENTS

JP    2010244345 A  * 10/2010  ............. G06Q 10/00
WO    2016112099 A1    7/2016

OTHER PUBLICATIONS

Power Ledger PTY LTD., Power Ledger White Paper, Publisher: Power Ledger Pty Ltd, https://powerledger.io/wp-content/uploads/2017/07/PL-WP-FINAL pdf, Jul. 4, 2017, Sections 1.7, 5.5.2.
(Continued)

*Primary Examiner* — Neha Patel
*Assistant Examiner* — Chunling Ding

(57) ABSTRACT

An example operation may include one or more of storing a plurality of transactions in a carbon footprint blockchain, each stored transaction including one or more items and a carbon footprint associated with the one or more items included in the transaction, receiving a transaction processing request from a merchant terminal, the transaction processing request including an identification of an item and a user identification, executing chaincode which determines an aggregate carbon footprint of the user based on a carbon footprint of the item and a carbon footprint of one or more previous purchases of the user stored in the carbon footprint blockchain, and transmitting information about the determined aggregate carbon footprint of the user to the merchant terminal.

20 Claims, 5 Drawing Sheets

(51) Int. Cl.
    *H04L 29/06*     (2006.01)
    *H04L 9/32*     (2006.01)
    *G06Q 20/40*     (2012.01)
    *G06Q 10/06*     (2012.01)
    *G16Y 10/45*     (2020.01)

(52) U.S. Cl.
    CPC ......... *G06Q 20/401* (2013.01); *H04L 9/3236* (2013.01); *H04L 63/0442* (2013.01); *G06Q 2220/00* (2013.01); *G16Y 10/45* (2020.01)

(58) Field of Classification Search
    CPC ............... H04L 63/0442; H04L 9/3236; H04L 2209/38; H04L 9/3239; G16Y 10/45
    See application file for complete search history.

(56) References Cited

U.S. PATENT DOCUMENTS

| | | | | |
|---|---|---|---|---|
| 2011/0213690 | A1* | 9/2011 | Ghosh | G06Q 40/04 705/317 |
| 2012/0011063 | A1* | 1/2012 | Killian | G06Q 20/349 705/41 |
| 2013/0054332 | A1* | 2/2013 | Ross | G06Q 30/02 705/14.25 |
| 2014/0289092 | A1* | 9/2014 | Keir | G06Q 40/04 705/37 |
| 2016/0179375 | A1* | 6/2016 | Ki | G06F 12/0246 711/153 |
| 2016/0253663 | A1* | 9/2016 | Clark | G06Q 20/02 705/75 |
| 2016/0335637 | A1* | 11/2016 | Deshpande | H04W 4/14 |
| 2017/0109735 | A1 | 4/2017 | Sheng et al. | |
| 2017/0351978 | A1* | 12/2017 | Bellowe | G06Q 50/01 |
| 2018/0060204 | A1* | 3/2018 | Jin | G06F 11/3409 |
| 2018/0121918 | A1* | 5/2018 | Higgins | G06Q 20/02 |
| 2018/0174149 | A1* | 6/2018 | Goldschmidt | G07F 7/1008 |
| 2018/0189753 | A1* | 7/2018 | Konda | G06Q 20/065 |
| 2018/0260212 | A1* | 9/2018 | Wisnovsky | G06F 8/71 |
| 2018/0315047 | A1* | 11/2018 | Kennedy | G06Q 20/02 |
| 2018/0349990 | A1* | 12/2018 | Diriye | G06Q 20/20 |
| 2019/0057396 | A1* | 2/2019 | Cui | G06Q 40/04 |
| 2020/0250676 | A1* | 8/2020 | Sierra | H04L 9/3239 |

OTHER PUBLICATIONS

Molly Suda et al., Blockchain Energizer—vol. 2, Publisher: K&L Gates, http://www.klgates.com/blockchain-energizer-vol-2-04-20-2017/, Apr. 20, 2017, pp. 1 and 2.

\* cited by examiner

CARBON FOOTPRINT BLOCKCHAIN NETWORK

TECHNICAL FIELD

This application generally relates to blockchain transactions, and more particularly, to a carbon footprint blockchain network.

BACKGROUND

Carbon footprint refers to the amount of greenhouse gases (GHGs) produced directly and indirectly by a person, product, event, or the like, and is usually expressed in equivalent tons of carbon dioxide ($CO_2$). A person's individual carbon footprint can be though of as a summation of all emissions of $CO_2$ and other GHGs induced by the person's activities over a given period of time. Carbon dioxide and other greenhouse gases can be attributed to global warming as well as other negative consequences to the environment such as pollution. These gases can be emitted through daily global activities including land clearance, the production and consumption of food, fuels, manufactured goods, materials, wood, roads, buildings, transportation and other services, and the like.

Most of the carbon footprint emissions for the average household come from "indirect" sources, for example, fuel that is burned to produce goods far away from the final consumer and the like. Indirect carbon footprint emissions can be distinguished from emissions which come from burning fuel directly in one's car or stove, commonly referred to as direct sources of the consumer's carbon footprint. As a result, it can be difficult to determine exactly how much carbon footprint a person or a household is responsible for.

Meanwhile, a blockchain may be used as a distributed public ledger to store information such as digital assets and the like. A blockchain is typically distributed across multiple points of entry (i.e., nodes or peers) and is a consensus of replicated, shared, and synchronized transactions. There is typically no central administrator or data storage. Furthermore, because any individual or entity can often provide information to a blockchain, this information should be reviewed and confirmed. This operation is known as consensus. There are two types of consensus centralized and decentralized. Centralized consensus includes one central database that is used to rule transaction validity. A decentralized consensus transfers authority and trust to a decentralized network and enables its nodes to continuously and sequentially record their transactions on a public "block", creating a unique "chain" referred to as a blockchain. Cryptography, via hash codes, is used with a blockchain to secure an authentication of a transaction source and removes the need for a central intermediary.

SUMMARY

In one example embodiment, provided is a method that includes one or more of storing a plurality of transactions in a carbon footprint blockchain, where each stored transaction may include one or more items included in the transaction and a carbon footprint associated with the one or more items included in the transaction, receiving a transaction processing request from a merchant terminal, where the transaction processing request may include an identification of an item and a user identification, executing chaincode which determines an aggregate carbon footprint of the user based on a carbon footprint of the item and a carbon footprint of one or more previous purchases of the user stored in the carbon footprint blockchain, and transmitting information about the determined aggregate carbon footprint of the user to the merchant terminal.

In another example embodiment, provided is a computing system that includes one or more of a storage configured to store a plurality of transactions in a carbon footprint blockchain, where each stored transaction may include one or more items included in the transaction and a carbon footprint associated with the one or more items included in the transaction, a network interface configured to receive a transaction processing request from a merchant terminal, the transaction processing request may include an identification of an item and a user identification, and a processor configured to perform one or more of execute chaincode which determines an aggregate carbon footprint of the user based on a carbon footprint of the item and a carbon footprint of one or more previous purchases of the user stored in the carbon footprint blockchain, wherein the processor may be further configured to control the network interface to transmit information about the determined aggregate carbon footprint of the user to the merchant terminal.

In another example embodiments, provided is a non-transitory computer readable medium having stored therein program instructions that when executed cause a computer to perform one or more of storing a plurality of transactions in a carbon footprint blockchain, where each stored transaction may include one or more items included in the transaction and a carbon footprint associated with the one or more items included in the transaction, receiving a transaction processing request from a merchant terminal, the transaction processing request may include an identification of an item and a user identification, executing chaincode which determines an aggregate carbon footprint of the user based on a carbon footprint of the item and a carbon footprint of one or more previous purchases of the user stored in the carbon footprint blockchain, and transmitting information about the determined aggregate carbon footprint of the user to the merchant terminal.

Other features and modifications may be apparent from the following description when taken in conjunction with the drawings and the claims.

BRIEF DESCRIPTION OF THE DRAWINGS

For a proper understanding of the examples described herein, reference should be made to the enclosed figures. It should be appreciated that the figures depict only some embodiments and are not limiting of the scope of the present disclosure.

DETAILED DESCRIPTION

Figure 1:
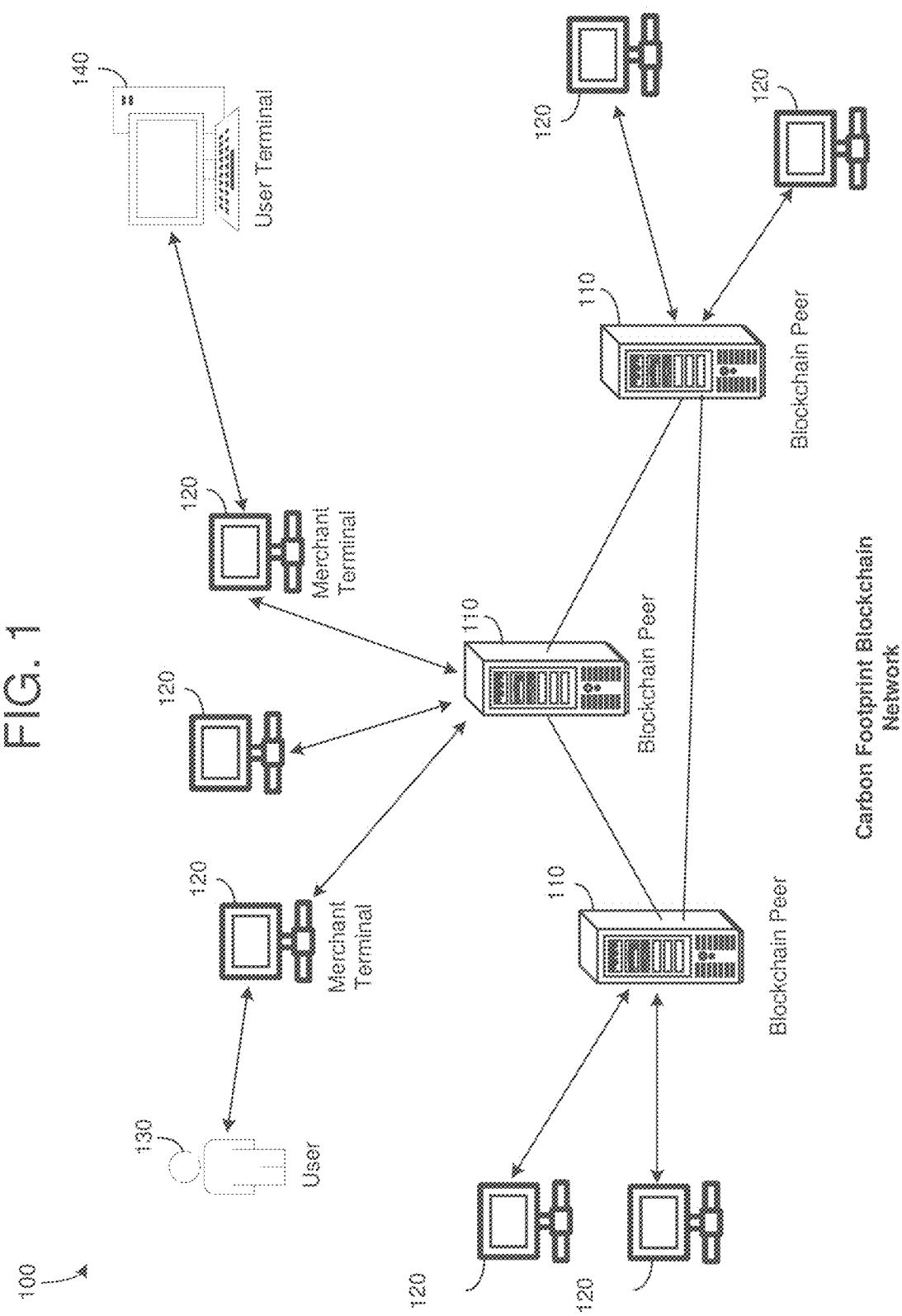
FIG. 1 is a diagram illustrating a carbon footprint blockchain network in accordance with an example embodiment.

It will be readily understood that the components of the present application, as generally described and illustrated in the figures herein, may be arranged and designed in a wide variety of different configurations. Thus, the following detailed description of the embodiments of at least one of a method, apparatus, non-transitory computer readable medium and system, as represented in the attached figures, is not intended to limit the scope of the application as claimed, but is merely representative of selected embodiments.

The features, structures, or characteristics as described throughout this specification may be combined in any suitable manner throughout the embodiments. In addition, the usage of the phrases such as "example embodiments", "some embodiments", or other similar language, throughout this specification is used to indicate that a particular feature, structure, or characteristic described in connection with the embodiment may be included in the at least one embodiment and is not to be construed as being omitted from other embodiments. Thus, appearances of the phrases "example embodiments", "in some embodiments", "in other embodiments", or other similar language, may be used to refer to the same group of embodiments, and the described features, structures, or characteristics may be combined in any suitable manner in one or more embodiments.

In addition, while the term "message" may be used in the description of embodiments, the application may be applied to many types of network data, such as, packet, frame, datagram, etc. The term "message" or "request" may include packet, frame, datagram, and any equivalents thereof. Furthermore, while certain types of messages and signaling requests may be depicted in example embodiments they are not limited to a certain type of message, and the application is not limited to a certain type of signaling.

The instant application in one embodiment relates to blockchain transactions, and in another embodiment, relates to managing an allowable carbon footprint usage via a blockchain network that enables merchants to receive and to update carbon footprint information about a user or a group of users within a carbon footprint blockchain during a purchase transaction. Manufacturers, distributors, merchants, and the like, may assign a carbon footprint amount to items (e.g., goods and services). When a user purchases or attempts to purchase an item through a purchase transaction with a merchant, the merchant may execute/process the transaction through a carbon footprint blockchain and a result of the transaction may be stored on the carbon footprint blockchain. In some embodiments, the transaction may be approved/denied by the carbon footprint blockchain network. As another example, the carbon footprint blockchain may suggest a different item to be purchased in place of the item initially desired by the user. As another example, the carbon footprint blockchain may levy a tax on the user if they continue with the purchase of the initial item.

The transactions executed and stored in the carbon footprint blockchain may include information associated with the transaction including a user ID (or family/group ID), an item ID or item IDs, a carbon footprint level (e.g., positive, negative, neutral, etc.), a time stamp, and the like. Each time the user attempts to purchase an item from any merchant associated with the carbon footprint blockchain network, the carbon footprint blockchain (e.g., smart contract, chaincode, etc.) may determine a previous amount of carbon footprint consumed by the user during a predetermined period of time, and provide this information to the merchant at the time of transaction, or make a determination (e.g., approval, decline, levy taxes, etc.) on the transaction at the time of purchase. In some embodiments, the determination may be based on the user's aggregated carbon footprint over a predetermined period of time (e.g., days, weeks, months, years, etc.) Here, the allowed amount of carbon footprint may be government mandated.

The example embodiments may be implemented by a smart contract or chaincode that is stored on the blockchain. The chaincode may ensure that any transaction which would cause the allowable carbon limit for a user or a user's family to exceed a predetermined threshold, will be rejected or will cause the system to provide an alternate product or service in place of the item the user is attempting to purchase. In some cases, a user may be a standalone ID on the blockchain or they may be part of a larger group such as a family ID, an office ID, and the like. The blockchain may maintain a dependent list or associated list of users for each user where each person will be identified by unique ID, like ADHAR Card, SSN, etc. The blockchain may also process a transaction based on product identification, for example, a carbon footprint associated with an item involved in the purchase such as a car which has gone over multiple hands via sale, lease, rent etc. In some embodiments, a government agency or other authority can manage the carbon footprint blockchain and can attract additional tax for the product if the aggregated carbon footprint of the user or of a group of users exceeds the threshold value.

FIG. 1 illustrates a carbon footprint blockchain network 100 in accordance with an example embodiment. Referring to FIG. 1, the network 100 includes a distributed group of blockchain peers 110 which may communicate with one another and store a replica of a carbon footprint blockchain which is subject to consensus among the blockchain peers 110 (also referred to as nodes). According to various embodiments, the carbon footprint blockchain may be used to execute and record transactions of items which are purchased by users. Each transaction recorded may include a unique carbon footprint blockchain ID, a user ID, an item ID, a carbon footprint level of the items included in the transaction, and the like. The merchant terminals 120 (e.g., computers, tablets, mobile devices, POS terminals, and the like) may communicate with the blockchain peers 110 via a network such as the Internet, a private network, or the like, and provide transaction information to the carbon footprint blockchain. In some embodiments, the merchant terminals 120 may also be configured for processing payment transactions through a payment network (not shown) such as an electronic payment network (EPN) which may be an electronic automated clearing house (ACH).

According to various embodiments, any of the merchant terminals 120 may transmit carbon footprint information as part of a transaction processing request to a blockchain peer 110. Here, the customer (e.g., user 130 and user terminal 140 in FIG. 1) may be a customer visiting the merchant in-person, an online shopping customer, a call customer, and the like. The carbon footprint information provided by a merchant may include an identification of a user (e.g., SSN, ADHAR, driver's license, username, password, etc.) which is unique to the user. The carbon footprint information may also include an identification of the items included in the purchase and a positive value, negative value, or neutral value associated with the items included in the purchase transaction. Each item may also include a unique ID (e.g., SKU, RFID, tag, etc.) that identifies the item being purchased.

In response to receiving the request from a merchant terminal, a blockchain peer may determine an aggregate carbon footprint of the user based on a carbon footprint of the item and a carbon footprint of one or more previous purchases of the user stored in the carbon footprint blockchain. For example, the carbon footprint blockchain may be scanned by chaincode stored on any of the blockchain peers 110 which can determine "on-the-fly" all carbon footprint transactions of a user that have occurred over a predetermined period of time from previous transactions stored on the carbon footprint blockchain that are associated with the same user ID included in the transaction from the merchant terminal. Here, the smart contract or chaincode may be executed by any of the blockchain peers 110 causing the smart contract (or chaincode) to traverse the carbon footprint blockchain and aggregate a total carbon footprint for the user over a period of time. Furthermore, the blockchain peers 110 may transmit information about the determined aggregate carbon footprint of the user to any of the merchant terminals 120.

Figure 2:
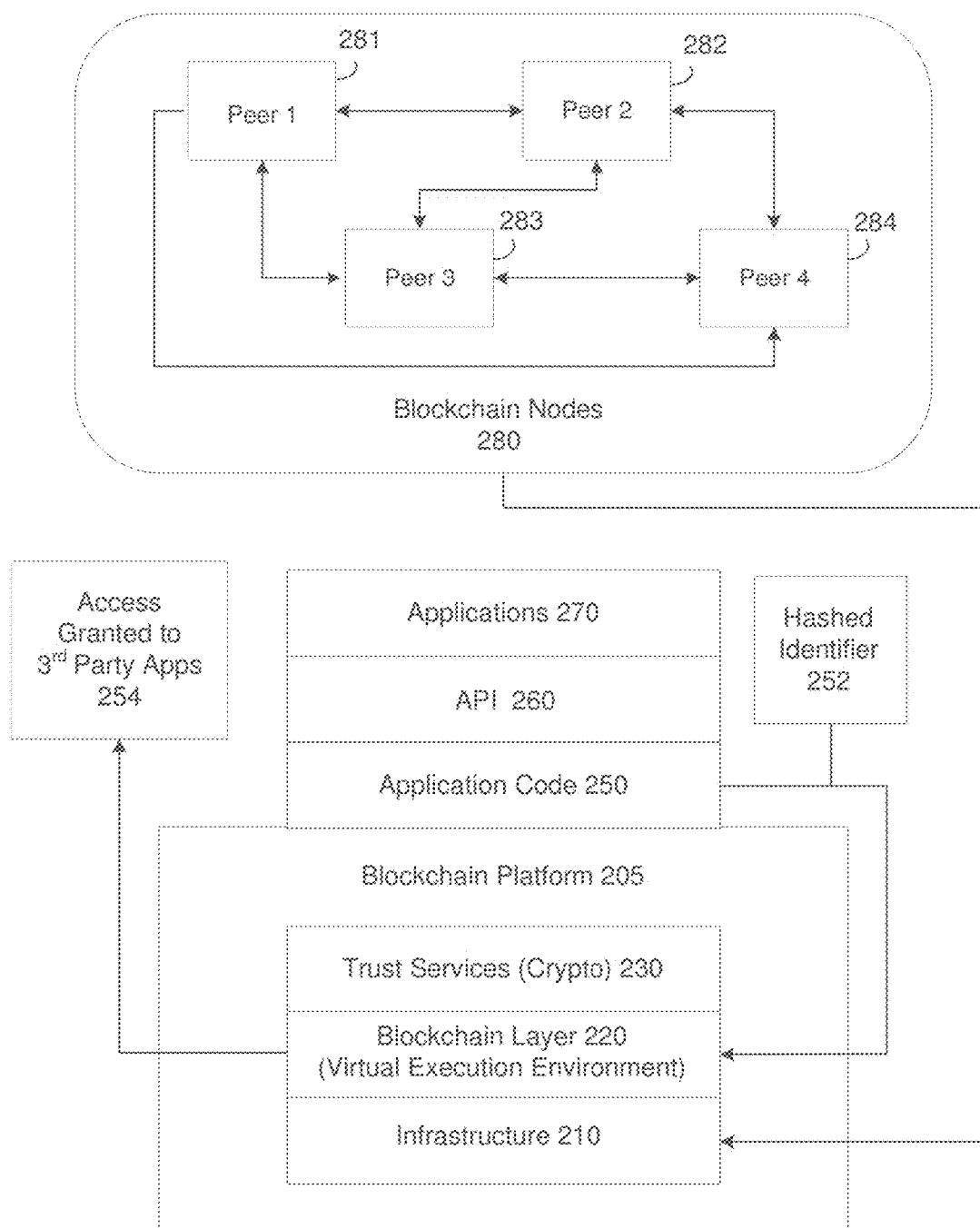
FIG. 2 is a diagram illustrating a blockchain system configuration in accordance with an example embodiment.

FIG. 2 illustrates a blockchain system database configuration, according to example embodiments. Referring to FIG. 2, blockchain system 200 may include certain common blockchain elements, for example, a group 280 of assigned peer blockchain nodes 281-284 which participate in blockchain transaction addition and validation process (consensus) within a carbon footprint blockchain network. As an example, the blockchain peers 110 shown in FIG. 1 may be the peer blockchain nodes 281-284, etc. Any of the blockchain peer nodes 280 may initiate a blockchain authentication and seek to write to a blockchain immutable ledger of the carbon footprint blockchain which may be stored in blockchain layer 220, a copy of which may also be stored on the underpinning physical infrastructure 210. In this configuration, the customized blockchain configuration may include one or applications 270 which are linked to application programming interfaces (APIs) 260 to access and execute stored program/application code (e.g., chain code and/or smart contracts) 250, which are created according to the customized configuration sought by the participants and can maintain their own state, control its own assets, and receive external information. This code can be deployed as a transaction and installed, via appending to the distributed ledger, on all blockchain peer nodes.

The blockchain base or platform 205 may include various layers of blockchain data, services (e.g., cryptographic trust services, virtual execution environment), and underpinning physical computer infrastructure necessary to receive and store new carbon footprint transactions and provide access to chaincode and auditors which are seeking to access data entries. The blockchain layer 220 may expose an interface that provides access to the virtual execution environment necessary to process the program code and engage the physical infrastructure 210. Cryptographic trust services 230 may be used to verify transactions such as carbon footprint purchase transactions and keep information private.

The blockchain configuration of FIG. 2 may process and execute program/application code 250 by way of one or more interfaces exposed, and services provided, by blockchain platform 205. The code may control blockchain assets. For example, the code can store and transfer data, and may be executed by the blockchain in the form of a smart contract and associated chain code with conditions or other code elements subject to its execution. The smart contracts 250 may be created to execute reminders, updates, and/or other notifications subject to the changes, updates, etc. According to various embodiments, the smart contracts 250 may include code which can determine an aggregate carbon footprint of a user (or a group of users) based on a current carbon footprint transaction and previous carbon footprint transactions stored in the carbon footprint blockchain.

In some embodiments, the smart contracts 250 may keep a running tab of carbon footprint for a user over a predetermined period of time. As another example, the smart contracts 250 can determine a carbon footprint of a user over a predetermined period of time in real-time by traversing the blockchain for all carbon footprint transactions associated with the user over a predetermined period of time. Each user may have their own user account and a carbon footprint credit to which they are authorized to use. When the user attempts to exceed their carbon footprint credit limit, the chaincode may implement additional processes or even decline a transaction.

The smart contracts can themselves be used to identify rules associated with authorization and access requirements and usage. For example, hashed identifier information 252 received from a user device may be processed by one or more processing entities (virtual machines) included in the blockchain layer 220. The result may include access being granted 254 to a third party application from the blockchain computing environment (VM). In this example, the previously known user identifiers or data template information may be stored in the blockchain platform 205. The physical machines 210 may be accessed to retrieve the user device template and the information can be used to match against incoming user identifiers for verification purposes.

Within chaincode, a smart contract may be created via a high-level application and programming language, then converted to a string that is written to a block in the blockchain. The smart contract may be invoked by a user device submitted operation or by another computing system or software program. The smart contract may write data to the blockchain in the format of key-value pairs. Furthermore, the smart contract code can read the values stored in a blockchain and use them in application operations such as carbon footprint aggregation. The smart contract code can write the output of various logic operations into the blockchain. The code may be used to create a temporary data structure in a virtual machine or other computing platform for storing and aggregating carbon footprint data. Data written to the blockchain can be public or can be encrypted and maintained as private. The temporary data that is used/generated by the smart contract is held in memory by the supplied execution environment, then deleted once the data needed for the blockchain is identified.

A chaincode may include the code interpretation of a smart contract, with additional features. As described herein, the chaincode may be program code deployed on a computing network, where it is executed and validated by chain validators together during a consensus process. The chaincode receives a hash and retrieves from the blockchain a hash associated with the data template created by use of a previously stored feature extractor. If the hashes of the hash identifier and the hash created from the stored identifier template data match, then the chaincode sends an authorization key to the requested service. The chaincode may write to the blockchain data associated with the cryptographic details.

Figure 3:
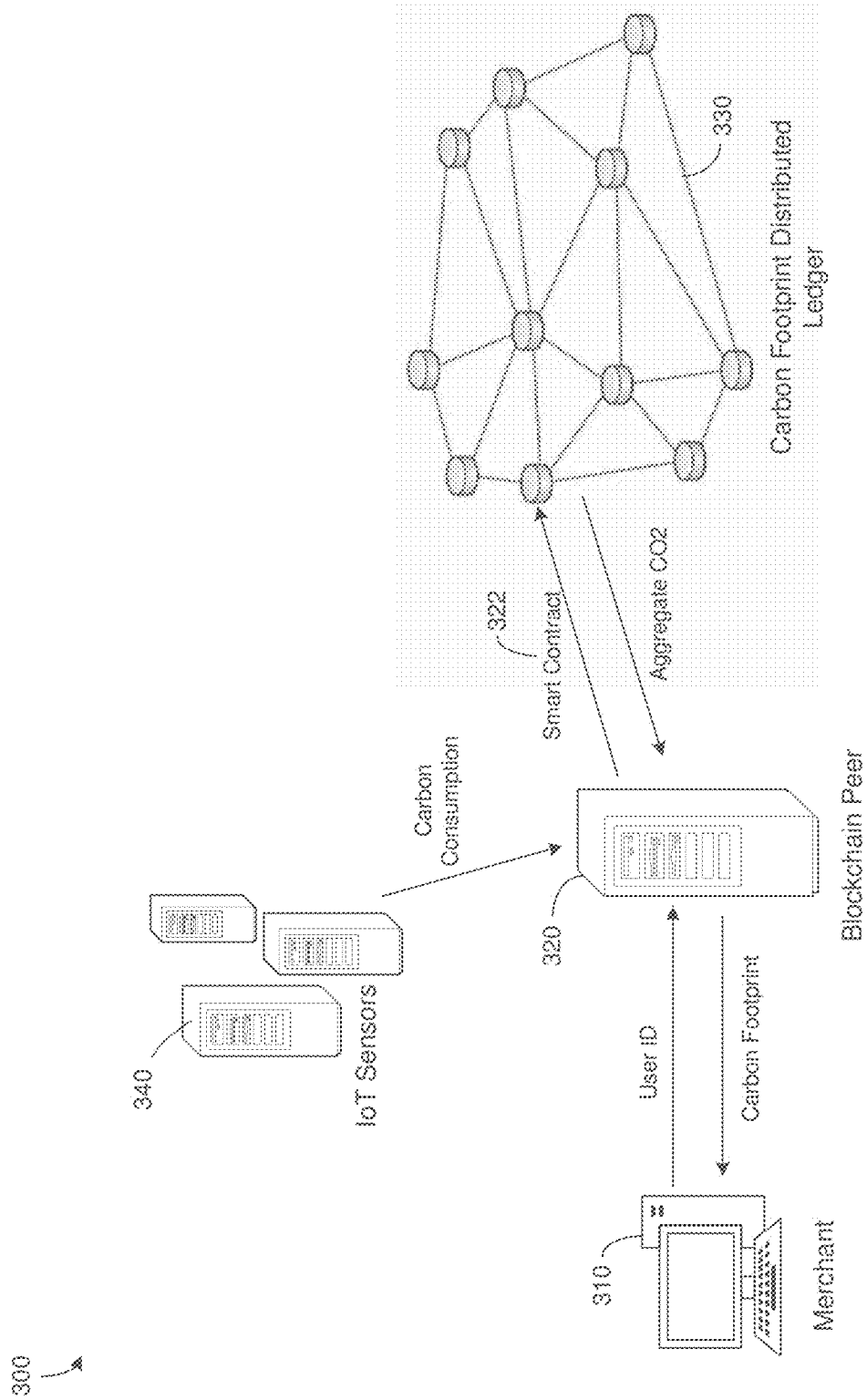
FIG. 3 is a diagram illustrating a blockchain network for aggregating a carbon footprint in accordance with an example embodiment.

FIG. 3 illustrates a blockchain network 300 for aggregating a carbon footprint in accordance with another example embodiment. It should be appreciated that the network 300 may be included within the network 100 shown in FIG. 1, or it may be a different network. Referring to FIG. 3, the blockchain network 300 includes a merchant computing system 310, a blockchain peer node 320, a carbon footprint blockchain 330, and Internet of Things (IoT) sensors. The merchant computer 310 and the IoT sensors 340 may be connected to the blockchain peer 320 via a network such as the Internet, payment network, private network, and the like. Meanwhile, the carbon footprint blockchain 330 may be stored by the blockchain peer 320 and replicated via consensus algorithms across other blockchain peers (not shown). The carbon footprint blockchain 330 may include a distributed ledger in which some data is made public (e.g., via a header) and some data remains encrypted or hidden from public view such as sensitive transaction data including payment account information, identification information, user name, etc.

The carbon footprint blockchain 330 may include a decentralized scheme (and in some cases distributed) on which the blockchain protocol is based, and which transfers authority and trust to a decentralized virtual network of peers. The blockchain peer 320 may record transactions on a public block thereby creating a unique chain (i.e., the carbon footprint blockchain). Each successive block may include a hash of the previous code; therefore, cryptography (via hash codes) may be used to secure the authentication of the transaction source and removes the need for a central intermediary. The combination of cryptography and blockchain technology together may ensure that there is never a duplicate recording of the same transaction.

The carbon footprint blockchain 330 may store carbon footprint data semi-publicly in a linear container space (the block). Anyone can verify that you've placed that information because the container has a signature on it, but only an authorized user (or a program) may be able to unlock what's inside the container with a private key to that data. For example, the carbon footprint blockchain 330 may behave almost like a database, except that part of the information stored (e.g., its header) may be public. In some embodiments, the header may include user identification, item identification, and the like, associated with a carbon footprint transaction to which the block corresponds. In some embodiments, the carbon footprint blockchain 330 may bind a number of peer computers (not shown) together that commonly obey the same consensus process for releasing or recording what carbon footprint information they hold, and where all related interactions may be verified by cryptography.

According to various aspects, a user may attempt to make a purchase through a merchant. In this example, merchant terminal 310 may receive a user identification and transfer the user ID along with transaction details about the purchase (e.g., item ID, carbon footprint amount, time stamp, etc.) to the blockchain peer 320. In response, the blockchain peer 320 may execute a smart contract 322 or other form of chaincode which when executed can determine whether to allow the transaction, deny the transaction, suggest alternative items, etc., based on an aggregate carbon footprint of the user which may be extracted by the smart contract 322 from the carbon footprint blockchain 330. For example, a product manufacturer may tag each product with an appropriate carbon footprint amount or a service organization may tag a carbon footprint amount against each service. While purchasing any product or availing any service, a corresponding carbon footprint level is inserted into the carbon footprint blockchain when the transaction takes place at the merchant terminal 310. In some embodiments, the carbon footprint blockchain 330 may also gather types of usage and availing of any service of a purchased product or consumption of resources from the IoT sensors 340 which can be added to a user's account or aggregate carbon footprint for making a carbon footprint authorization determination. The footprint measure can be positive or negative based on the kind of transaction.

The chaincode for the smart contract 322 in the blockchain peer node 320 can be written in such a way that any transaction which would make the aggregate carbon footprint exceed the permitted quota for the timeframe can be rejected in the blockchain. For example, the smart contract 322 may be customized using the per capita carbon footprint with authorized government body based on a number of dependent persons associated with the user or based on a single user. The smart contract 322 may determine how much of the allocated carbon footprint a user has consumed by analyzing all the blockchain based transactions which would have negative and positive numbers and in some cases, also based on the data received from the IoT sensors 340.

The smart contract 322 may determine whether to authorize or deny the transaction based on an aggregate carbon footprint for the user. For example, the smart contract may combine the carbon footprint of the current transaction with the carbon footprint of the user from other previous transactions within a predetermined time period, and determine whether the aggregate carbon footprint will exceed a threshold amount. In other words, if the purchase will cause the user's carbon footprint account/credit to exceed a threshold. If the smart contract 322 determines that the purchase of the item by the user at the merchant terminal 310 is within the user's carbon footprint threshold, the smart contract 322 may authorize or approve of the transaction, execute the transaction on the carbon footprint blockchain 330, and store the results in the carbon footprint blockchain 330. Also, the smart contract 322 may return an approval to the merchant terminal 310. However, if the smart contract 322 determines that the purchase of the item or items will cause the user's account to exceed the threshold carbon footprint level, the smart contract 322 can decline the transaction and/or suggest an alternate item in place of the desired item. As another example, the smart contract 322 can levy a penalty or tax on the user at the time of purchase. The determination by the smart contract 322 and any addition information or suggestions may be sent to the merchant terminal 310 via the blockchain peer 320.

Figure 4:
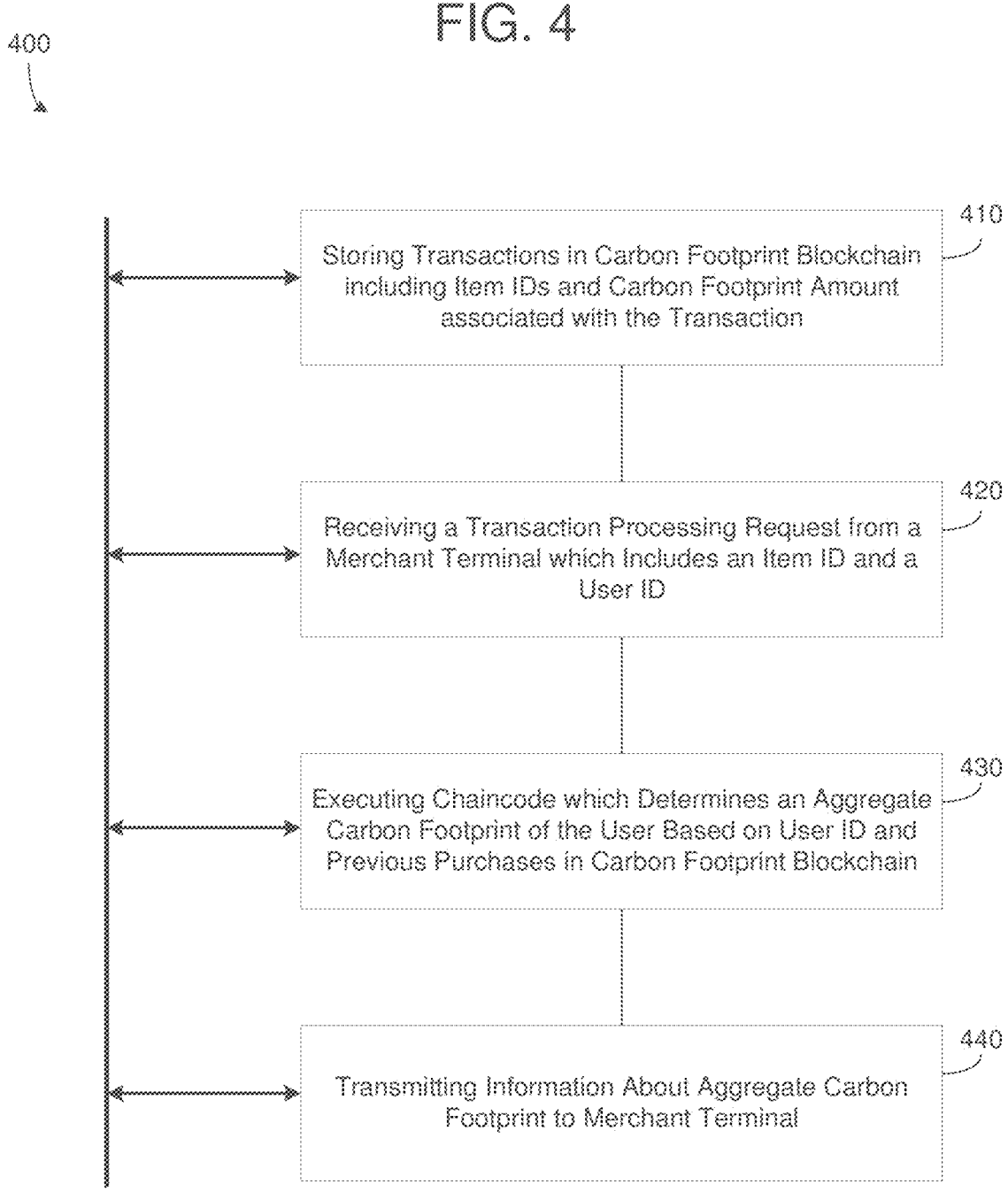
FIG. 4 is a diagram illustrating a method for processing a carbon footprint blockchain transaction in accordance with an example embodiment.

FIG. 4 illustrates a method 400 for processing a carbon footprint blockchain transaction in accordance with an example embodiment. For example, the method 400 may be performed by a blockchain node, smart contract, database, server, or a combination thereof. In 410, the method includes storing a plurality of transactions in a carbon footprint blockchain, each transaction including one or more items and a carbon footprint associated with the one or more items included in the transaction. For example, each transaction may include a user identification of a purchaser of the transaction, and a positive or a negative carbon footprint amount associated with the one or more items included in the transaction. In some embodiments, the carbon footprint may include a carbon footprint level or a carbon footprint amount inserted into the transaction processing request by the merchant terminal during a purchase transaction.

In 420, the method includes receiving a transaction processing request from a merchant terminal, the transaction processing request including an item identification and a user identification. For example, the transaction processing request may include a request to authorize a purchase transaction or the like. In response, in 430 the method includes executing chaincode (e.g., smart contract on the blockchain, etc.) which determines an aggregate carbon footprint of the user based on a carbon footprint of the item and a carbon footprint of one or more previous purchases of the user stored in the carbon footprint blockchain and transmitting information about the determined aggregate carbon footprint of the user to the merchant terminal, in 440. In some embodiments, the chaincode may determine the aggregate carbon footprint of the user in 430 based on a predetermined period of time with respect to a current time. The predetermined period of time may be a period of time up to and including the current time such as the previous week, the previous month, the previous year, etc.

According to various aspects, in 430 the chaincode may traverse the carbon footprint blockchain, unlock certain blocks having a corresponding user ID, and aggregate the carbon footprint of the user based on the user identification included in the transaction processing request and user identifications included in the transactions stored in the carbon footprint blockchain. In some embodiments, the chaincode determines the aggregate carbon footprint of a group of users including the user based on predetermined settings in the carbon footprint blockchain for the user. In some embodiments, in response to determining that the aggregate carbon footprint for the user is greater than a predetermined threshold, the method may further include suggesting a supplemental item in order to maintain the aggregate carbon footprint below the predetermined threshold. Here, the carbon footprint threshold for a user may be a per capita mandated carbon footprint level for a jurisdiction in which the purchase transaction takes place or where the user lives.

Figure 5:
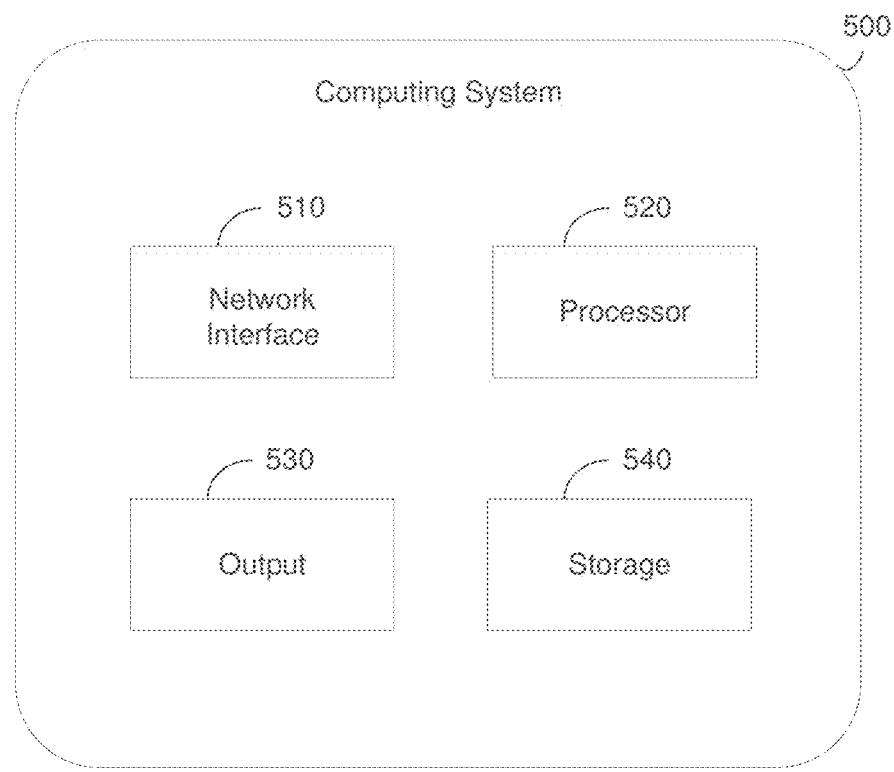
FIG. 5 is a diagram illustrating a computing system for processing a carbon footprint blockchain transaction in accordance with an example embodiment.

FIG. 5 illustrates a computing system 500 for processing a carbon footprint blockchain transaction in accordance with an example embodiment. For example, the computing system 500 may be the blockchain peer 110 shown in FIG. 1, or another server, device, cloud platform, and the like. Also, the computing system 500 may perform the method 400 of FIG. 4. Referring to FIG. 5, the computing system 500 includes a network interface 510, a processor 520, an output 530, and a storage device 540. The network interface 510 may transmit and receive data via the Internet, a private network, a public network, and the like. The network interface 510 may be a wireless interface, a wired interface, or the like. The processor 520 may include one or more processing devices each including one or more processing cores. In some examples, the processor 520 is a multicore processor or a plurality of multicore processors. The output 530 may output data to an embedded display of the computing system 500, an externally connected display, a cloud platform, and the like. The storage device 540 is not limited to any kind of storage device and may include any known memory device such as RAM, ROM, hard disk, and the like. The storage 540 may store a broadcast encryption tree including a set of encryption keys for a plurality of peers that make up a blockchain network.

According to various embodiments, the storage 540 may store a plurality of transactions in a carbon footprint blockchain and each transaction may include one or more items and a carbon footprint associated with the one or more items included in the transaction. For example, the plurality of transactions stored in the carbon footprint blockchain may each include a user identification of a purchaser of the transaction, and a positive or a negative carbon footprint amount associated with the one or more items included in the transaction. The network interface 510 may receive a transaction processing request from a merchant terminal. For example, the transaction processing request may include an item identification and a user identification. The processor 520 may execute chaincode included within the blockchain system which determines an aggregate carbon footprint of the user based on a carbon footprint of the item and a carbon footprint of one or more previous purchases of the user stored in the carbon footprint blockchain. Furthermore, the processor 520 may control the network interface 510 to transmit information about the determined aggregate carbon footprint of the user to the merchant terminal.

In some embodiments, the processor 520 executing the chaincode may cause the chaincode to determine the aggregate carbon footprint of the user based on a predetermined period of time with respect to a current time. For example, the processor 520 executing the chaincode may cause the chaincode to traverse the carbon footprint blockchain and aggregate the carbon footprint of the user based on the user identification included in the transaction processing request and user identifications included in the transactions stored in the carbon footprint blockchain. In some embodiments, when the processor 520 determines that the aggregate carbon footprint for the user is greater than a predetermined threshold, the processor 520 may control the network interface 510 to transmit an identification or other information about a supplemental item in order to maintain the aggregate carbon footprint below the predetermined threshold.

Although an exemplary embodiment of at least one of a system, method, and non-transitory computer readable medium has been illustrated in the accompanied drawings and described in the foregoing detailed description, it will be understood that the application is not limited to the embodiments disclosed, but is capable of numerous rearrangements, modifications, and substitutions as set forth and defined by the following claims. For example, the capabilities of the system of the various figures can be performed by one or more of the modules or components described herein or in a distributed architecture and may include a transmitter, receiver or pair of both. For example, all or part of the functionality performed by the individual modules, may be performed by one or more of these modules. Further, the functionality described herein may be performed at various times and in relation to various events, internal or external to the modules or components. Also, the information sent between various modules can be sent between the modules via at least one of: a data network, the Internet, a voice network, an Internet Protocol network, a wireless device, a wired device and/or via plurality of protocols. Also, the messages sent or received by any of the modules may be sent or received directly and/or via one or more of the other modules.

One skilled in the art will appreciate that a "system" could be embodied as a personal computer, a server, a console, a personal digital assistant (PDA), a cell phone, a tablet computing device, a smartphone or any other suitable computing device, or combination of devices. Presenting the above-described functions as being performed by a "system" is not intended to limit the scope of the present application in any way, but is intended to provide one example of many embodiments. Indeed, methods, systems and apparatuses disclosed herein may be implemented in localized and distributed forms consistent with computing technology.

It should be noted that some of the system features described in this specification have been presented as modules, in order to more particularly emphasize their implementation independence. For example, a module may be implemented as a hardware circuit comprising custom very large scale integration (VLSI) circuits or gate arrays, off-the-shelf semiconductors such as logic chips, transistors, or other discrete components. A module may also be implemented in programmable hardware devices such as field programmable gate arrays, programmable array logic, programmable logic devices, graphics processing units, or the like.

A module may also be at least partially implemented in software for execution by various types of processors. An identified unit of executable code may, for instance, comprise one or more physical or logical blocks of computer instructions that may, for instance, be organized as an object, procedure, or function. Nevertheless, the executables of an identified module need not be physically located together, but may comprise disparate instructions stored in different locations which, when joined logically together, comprise the module and achieve the stated purpose for the module. Further, modules may be stored on a computer-readable medium, which may be, for instance, a hard disk drive, flash device, random access memory (RAM), tape, or any other such medium used to store data.

Indeed, a module of executable code could be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network.

It will be readily understood that the components of the application, as generally described and illustrated in the figures herein, may be arranged and designed in a wide variety of different configurations. Thus, the detailed description of the embodiments is not intended to limit the scope of the application as claimed, but is merely representative of selected embodiments of the application.

One having ordinary skill in the art will readily understand that the above may be practiced with steps in a different order, and/or with hardware elements in configurations that are different than those which are disclosed. Therefore, although the application has been described based upon these preferred embodiments, it would be apparent to those of skill in the art that certain modifications, variations, and alternative constructions would be apparent.

The invention claimed is:

1. A method, comprising:
storing a plurality of transactions in a plurality of blocks on a carbon footprint blockchain and storing carbon footprint values of the plurality of transactions in non-encrypted headers of the plurality of blocks, where each transaction and its content are encrypted within a block of the plurality of blocks, and the carbon footprint values stored in the non-encrypted headers comprise positive and negative numerical values;
receiving a transaction request between a user and a merchant from a merchant terminal which comprises an identification of an item, an identification of the user, and a timestamp;
invoking chaincode installed on a blockchain peer of the carbon footprint blockchain in response to the received transaction request;
reading, via the invoked chaincode installed within the blockchain peer of the carbon footprint blockchain, carbon footprint values of the user from previous transactions of the user stored within the non-encrypted headers of the plurality of blocks on the carbon footprint blockchain which have occurred within a predetermined period of time with respect to a time value of the timestamp and which are read from the non-encrypted headers of the plurality of blocks on the carbon footprint blockchain;
aggregating the carbon footprint values of the user from the previous transactions of the user within the predetermined period of time;
determining, via the chaincode of the carbon footprint blockchain, whether to approve or reject the transaction request based on the aggregate carbon footprint value of the user and a carbon footprint value of the item; and
transmitting the determination to the merchant terminal.

2. The method of claim 1, wherein the predetermined period includes a previous point in time up to a current time identified by the timestamp.

3. The method of claim 1, wherein the reading comprises reading a positive or a negative carbon footprint value from a transaction within the previous transactions and the aggregating comprises aggregating the positive or the negative carbon footprint value with other positive and/or negative carbon footprint values read from other previous transactions.

4. The method of claim 1, wherein the chaincode determines the aggregate carbon footprint value of a group of users including the user based on predetermined settings in the carbon footprint blockchain for the user.

5. The method of claim 1, wherein the transaction request comprises the carbon footprint value of the item inserted into the transaction request by the merchant terminal during a purchase transaction.

6. The method of claim 1, further comprising determining that the aggregate carbon footprint value for the user is greater than a predetermined threshold, and suggesting a supplemental item to purchase in order to maintain the aggregate carbon footprint value below the predetermined threshold.

7. The method of claim 6, wherein the predetermined threshold is based on a per capita mandated carbon footprint value for a jurisdiction.

8. The method of claim 1, wherein the chaincode comprises a smart contract installed within a computing device that stores a distributed ledger including the carbon footprint blockchain.

9. The method of claim 1, wherein the previous carbon footprint transactions of the user further include encrypted payment information stored in a data section of the blocks.

10. The method of claim 1, wherein the determining comprises determining to reject the transaction request based on a combination of the aggregate carbon footprint value of the user and the carbon footprint value of the item being greater than a predetermined carbon footprint threshold, and transmitting notification of the rejection to the merchant terminal.

11. A computing system comprising:
a storage configured to store a plurality of transactions in a plurality of blocks on a carbon footprint blockchain and store carbon footprint values of the plurality of transactions in non-encrypted headers of the plurality of blocks, where each transaction and its content are encrypted within a block of the plurality of blocks, and the carbon footprint values stored in the non-encrypted headers comprise positive and negative numerical values;
a network interface configured to receive a transaction request between a user and a merchant from a merchant terminal which comprises an identification of an item, an identification of the user, and a timestamp; and
a processor configured to invoke chaincode installed on a blockchain peer of the carbon footprint blockchain in response to the received transaction request;

read, via the invoked chaincode installed on the blockchain peer of the carbon footprint blockchain, carbon footprint values of the user from previous transactions of the user stored within the non-encrypted headers of the plurality of blocks on the carbon footprint blockchain which have occurred within a predetermined period of time with respect to a time value of the timestamp and which are read from the non-encrypted headers of the plurality of blocks on the carbon footprint blockchain, aggregate the carbon footprint values of the user from the previous transactions of the user within the predetermined period of time; and determine, via the chaincode of the carbon footprint blockchain, whether to approve or reject the transaction request based on the aggregate carbon footprint value of the user and a carbon footprint value of the item, wherein the processor is further configured to control the network interface to transmit the determination to the merchant terminal.

12. The computing system of claim 11, wherein the predetermined period of time includes a previous point in time up to a current time identified by the timestamp.

13. The computing system of claim 11, wherein the processor is configured to read a positive or a negative carbon footprint value from a transaction within the previous transactions and aggregate the positive or the negative carbon footprint value with other positive and/or negative carbon footprint values read from other previous transactions.

14. The computing system of claim 11, wherein the processor executing the chaincode causes the chaincode to determine the aggregate carbon footprint value of a group of users including the user based on predetermined settings in the carbon footprint blockchain for the user.

15. The computing system of claim 11, wherein the transaction request comprises the carbon footprint value of the item inserted into the transaction request by the merchant terminal during a purchase transaction.

16. The computing system of claim 11, wherein the processor is further configured to determine that the aggregate carbon footprint value of the user is greater than a predetermined threshold, and suggest a supplemental item to purchase in order to maintain the aggregate carbon footprint value below the predetermined threshold.

17. The computing system of claim 16, wherein the predetermined threshold is based on a per capita mandated carbon footprint value for a jurisdiction.

18. The computing system of claim 11, wherein the chaincode comprises a smart contract installed within a computing device that stores a distributed ledger including the carbon footprint blockchain.

19. A non-transitory computer readable medium having stored therein program instructions that when executed cause a computer to perform a blockchain processing method comprising:

storing a plurality of transactions in a plurality of blocks on a carbon footprint blockchain and storing carbon footprint values of the plurality of transactions in non-encrypted headers of the plurality of blocks, where each transaction and its content are encrypted within a block of the plurality of block, and the carbon footprint values stored in the non-encrypted headers comprise positive and negative numerical values;

receiving a transaction request between a user and a merchant from a merchant terminal which comprises an identification of an item, an identification of the user, and a timestamp;

invoking chaincode installed on a blockchain peer of the carbon footprint blockchain in response to the received transaction request;

reading, via the invoked chaincode installed within the blockchain peer of the carbon footprint blockchain, carbon footprint values of the user from previous transactions of the user stored within the non-encrypted headers of the plurality of blocks on the carbon footprint blockchain which have occurred within a predetermined period of time with respect to a time value of the timestamp and which are read from the non-encrypted headers of the plurality of blocks on the carbon footprint blockchain;

aggregating the carbon footprint values of the user from the previous carbon footprint transactions of the user within the predetermined period of time;

determining, via the chaincode of the carbon footprint blockchain, whether to approve or reject the transaction request based on the aggregate carbon footprint value of the user and a carbon footprint value of the item; and transmitting the determination to the merchant terminal.

20. The non-transitory computer readable medium of claim 19, wherein the predetermined period of time includes a previous point in time up to a current time identified by the timestamp.

* * * * *